(12) United States Patent
O'Brien

(10) Patent No.: US 10,322,427 B2
(45) Date of Patent: Jun. 18, 2019

(54) CLEANING FLUID DISPENSER

(71) Applicant: Scrub Daddy, Inc., Folcroft, PA (US)

(72) Inventor: John O'Brien, Folcroft, PA (US)

(73) Assignee: Scrub Daddy, Inc., Folcroft, PA (US)

( * ) Notice: Subject to any disclaimer, the term of this patent is extended or adjusted under 35 U.S.C. 154(b) by 0 days.

(21) Appl. No.: 15/718,231

(22) Filed: Sep. 28, 2017

(65) Prior Publication Data
US 2019/0091708 A1    Mar. 28, 2019

(51) Int. Cl.
| B05B 11/04 | (2006.01) |
| B05B 11/00 | (2006.01) |
| B65D 47/12 | (2006.01) |
| B05B 15/62 | (2018.01) |
| B05B 15/30 | (2018.01) |

(52) U.S. Cl.
CPC ........ B05B 11/0037 (2013.01); B05B 11/007 (2013.01); B05B 11/3001 (2013.01); B05B 15/30 (2018.02); B05B 15/62 (2018.02); B65D 47/127 (2013.01)

(58) Field of Classification Search
CPC . B05B 11/0037; B05B 11/3001; B05B 15/62; B05B 15/625
USPC .................................................. 222/330, 331
See application file for complete search history.

(56) References Cited

U.S. PATENT DOCUMENTS

| 2,593,591 A | 4/1952 | Menkin et al. |
| 3,739,955 A | 6/1973 | Gores |
| 4,757,922 A | 7/1988 | Landecker |
| 4,865,228 A | 9/1989 | Landecker |
| 5,033,655 A * | 7/1991 | Brown ................. B29C 65/568 222/212 |
| 6,158,674 A * | 12/2000 | Humphreys ............. B05B 1/14 222/321.6 |
| 6,953,297 B2 | 10/2005 | Dobbs et al. |
| 7,726,517 B2 | 6/2010 | Kennedy et al. |
| 7,980,777 B2 | 7/2011 | Kennedy et al. |
| D717,666 S | 11/2014 | Palm et al. |
| D743,257 S | 11/2015 | Van Handel et al. |
| 2008/0302831 A1* | 12/2008 | Wang .................. B05B 11/0086 222/321.5 |
| 2009/0242588 A1* | 10/2009 | Olson ................. B05B 11/0056 222/331 |
| 2010/0212778 A1* | 8/2010 | O'Brien ............. B05B 11/0056 141/284 |
| 2013/0037557 A1* | 2/2013 | Ting ....................... B65D 11/04 220/693 |
| 2015/0217314 A1* | 8/2015 | Kharbanda ......... B05B 11/3001 222/1 |

* cited by examiner

Primary Examiner — J C Jacyna
(74) Attorney, Agent, or Firm — Norman E. Lehrer

(57) ABSTRACT

A liquid soap dispenser includes a container having a flexible outer wall and including a quantity of liquid soap therein. The upper surface of the container can be moved between an upper position and a lower position but is spring biased into the upper position. A pump within said container pumps a portion of the liquid soap onto the upper surface when it is moved downwardly into its lower position. A normally closed valve at the bottom of the container opens to dispense liquid soap from the bottom of the container when the container is squeezed.

7 Claims, 4 Drawing Sheets

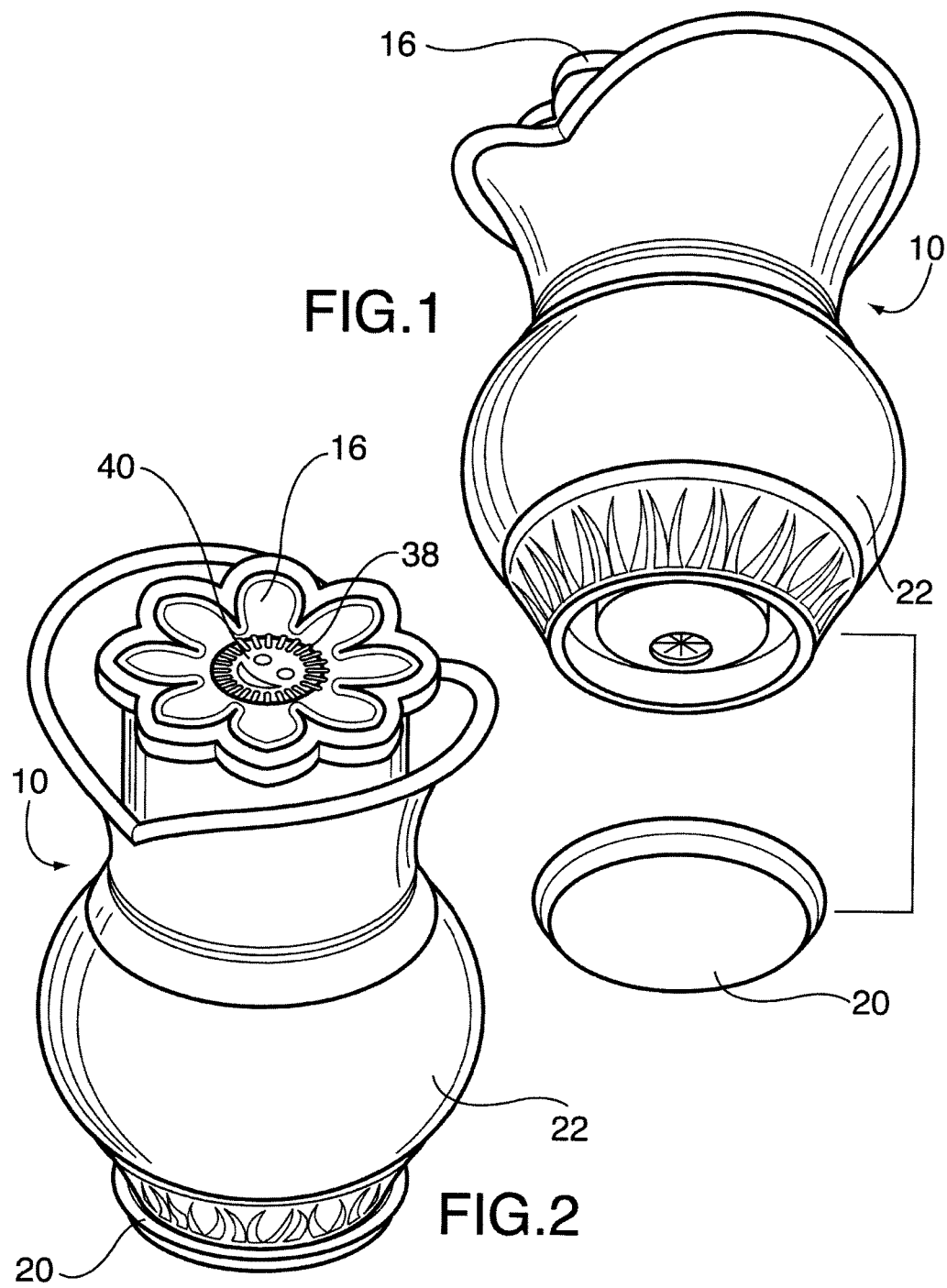

CLEANING FLUID DISPENSER

BACKGROUND OF THE INVENTION

The present invention is directed toward a cleaning fluid dispenser and more particularly, toward such a dispenser that is primarily intended to be utilized at a kitchen sink for dispensing a quantity of dishwashing liquid. The dispenser is capable of dispensing the dishwashing liquid from the bottom or from the top thereof without turning the dispenser upside down.

It is common to have a plastic bottle of dishwashing liquid next to a sink for dispensing a quantity of the dishwashing liquid when it is desired to manually wash dishes or pots and pans in the sink. Conventionally, the liquid dishwashing soap is in a container having an opening at the top. The opening is closed by a cap or a valve or the like. When it is desired to dispense the soap, the cap is removed or the valve is opened and the container is inverted and squeezed until the desired amount of detergent is dispensed. This procedure normally requires the use of two hands.

There are also times when a person wants to wash his or her hands at the sink but, with both hands dirty, does not want to hold the bottle of soap to invert the same. There are also times when one hand may be occupied with holding a pot or pan and soap is needed and must be obtained using the other hand. Obviously, there are situations for various reasons where a person may have only one usable hand. Under all of these circumstances, conventional soap containers that must have the top opened and then inverted can be a problem.

To overcome these issues, soap dispensers have been developed wherein the soap can be dispensed from the top thereof without inverting the dispenser. The dispensers include an internal pump mechanism and an upper surface that, when pushed down, forces the liquid detergent upwardly onto the upper surface. The upper surface can be pushed downwardly with the person's hand directly on the surface. In that case, the soap will be directed right onto the hand. Alternatively, a sponge or scrubber or the like can be located on the upper surface and the liquid soap can be dispensed onto the sponge. The sponge can be part of the dispenser or can simply be held in a person's hand and be used to push the upper surface of the dispenser down.

Dispensers, such as those described above, are shown, for example, in prior U.S. Pat. Nos. 7,726,517; 7,980,777; 2,593,591; 3,739,955; 4,757,922; 4,865,228 and D743,257. The contents of these prior patents are incorporated herein in their entireties.

While the above prior art patents help to alleviate the problem of providing soap to a person's hand without having to lift the container, they are somewhat limited. These devices are incapable of dispensing a quantity of liquid soap onto pots or pans or dishes or the like when this is desired. To applicant's knowledge, there is no dispenser available or proposed that is capable of dispensing soap onto a person's hand by pressing down on the top and is also capable of dispensing a quantity of soap onto pots or pans or dishes in a sink.

A need exists, therefore, for a liquid soap dispenser that is capable of dispensing soap directly onto a person's hand by pressing down on the top and is also capable of dispensing a quantity of soap onto pots or pans or dishes in a sink.

SUMMARY OF THE INVENTION

The present invention is designed to overcome the deficiencies of the prior art discussed above. It is an object of the present invention to provide a dish soap dispenser that can also dispense soap directly onto a person's hands.

It is another object of the present invention to provide a dish soap dispenser that can dispense soap onto a person's hand or on a sponge by pushing down on the top of the dispenser.

It is a still further object of the present invention to provide such a dispenser that can also be lifted and squeezed to dispense soap from a valve at the bottom thereof.

In accordance with the illustrative embodiments demonstrating features and advantages of the present invention, there is provided a liquid soap dispenser that includes a container having a flexible outer wall and including a quantity of liquid soap therein. The upper surface of the container can be moved between an upper position and a lower position but is spring biased into the upper position. A pump within said container pumps a portion of the liquid soap onto the upper surface when it is moved downwardly into its lower position. A normally closed valve at the bottom of the container opens to dispense liquid soap from the bottom of the container when the container is squeezed.

Other objects, features, and advantages of the invention will be readily apparent from the following detailed description of the preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a bottom perspective view of the liquid soap dispenser of my invention;

FIG. 2 is a top perspective view thereof;

DETAILED DESCRIPTION OF THE PREFERRED EMBODIMENTS

Figure 3:
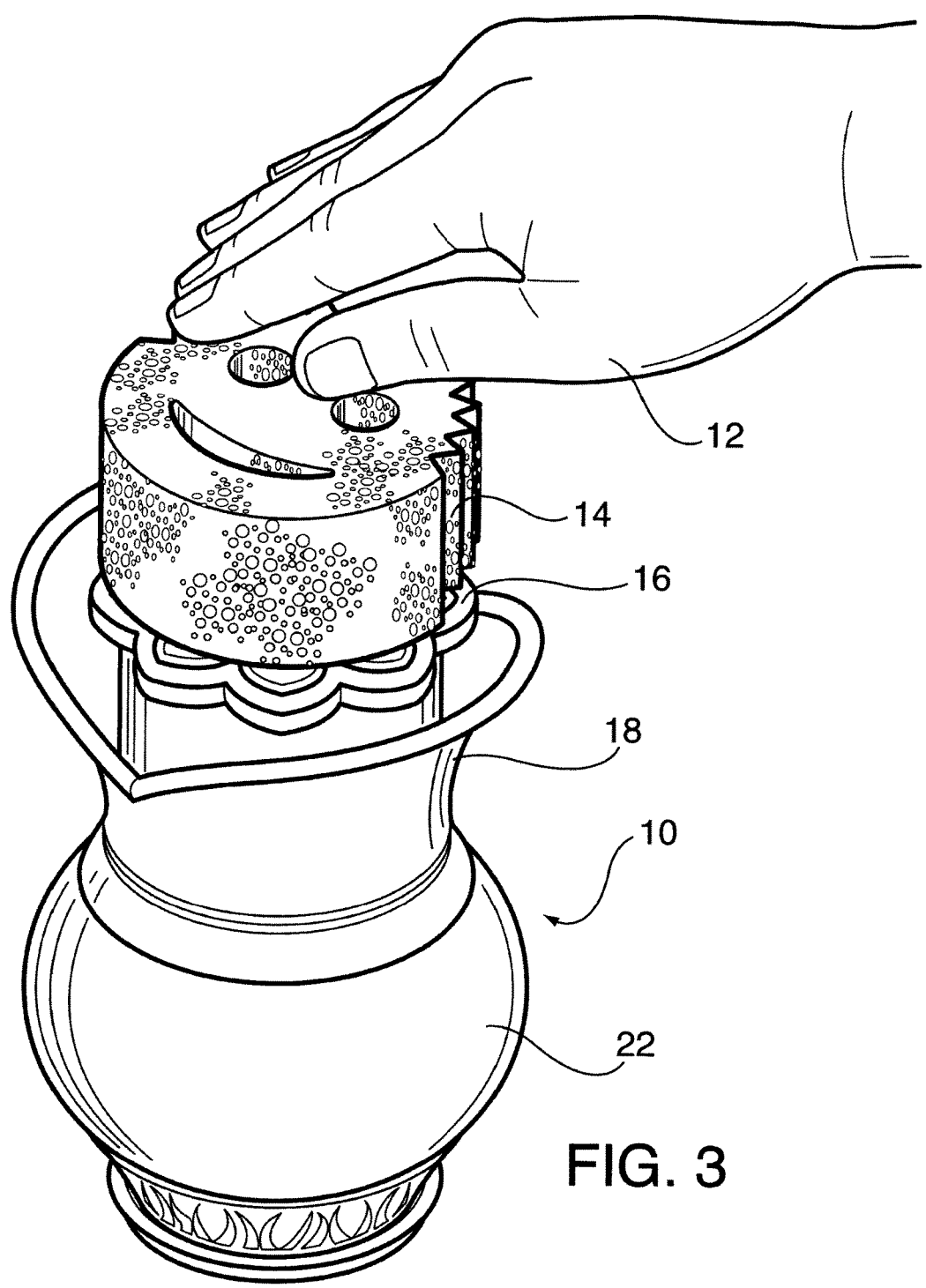
FIG. 3 is a top perspective view similar to FIG. 2 but showing a person's hand and sponge at the top of the dispenser.

Referring now to the drawings in detail wherein like reference numerals have been used throughout the various figures to designate like elements, there is shown in FIGS. 1-5 a liquid soap dispenser constructed in accordance with the principles of the present invention and designated generally as 10.

As will be described in more detail below, the liquid dispenser 10 can be used in several ways. By way of example, and as shown in FIG. 3, a person's hand 12 can push down either directly or through a sponge 14 on the upper surface 16 of the container 18 to force the liquid soap contained within the container upwardly onto the person's hand 12 or onto the sponge 14. Alternatively, the container 18 can be lifted off of the tray 20 and the flexible outer wall 22 of the container can be squeezed to force the liquid soap 24 out of the normally closed valve 26 at the bottom 28 of the container 18 onto the person's hand 12 or onto dishes or pots and pans or the like in a kitchen sink.

Figure 5:
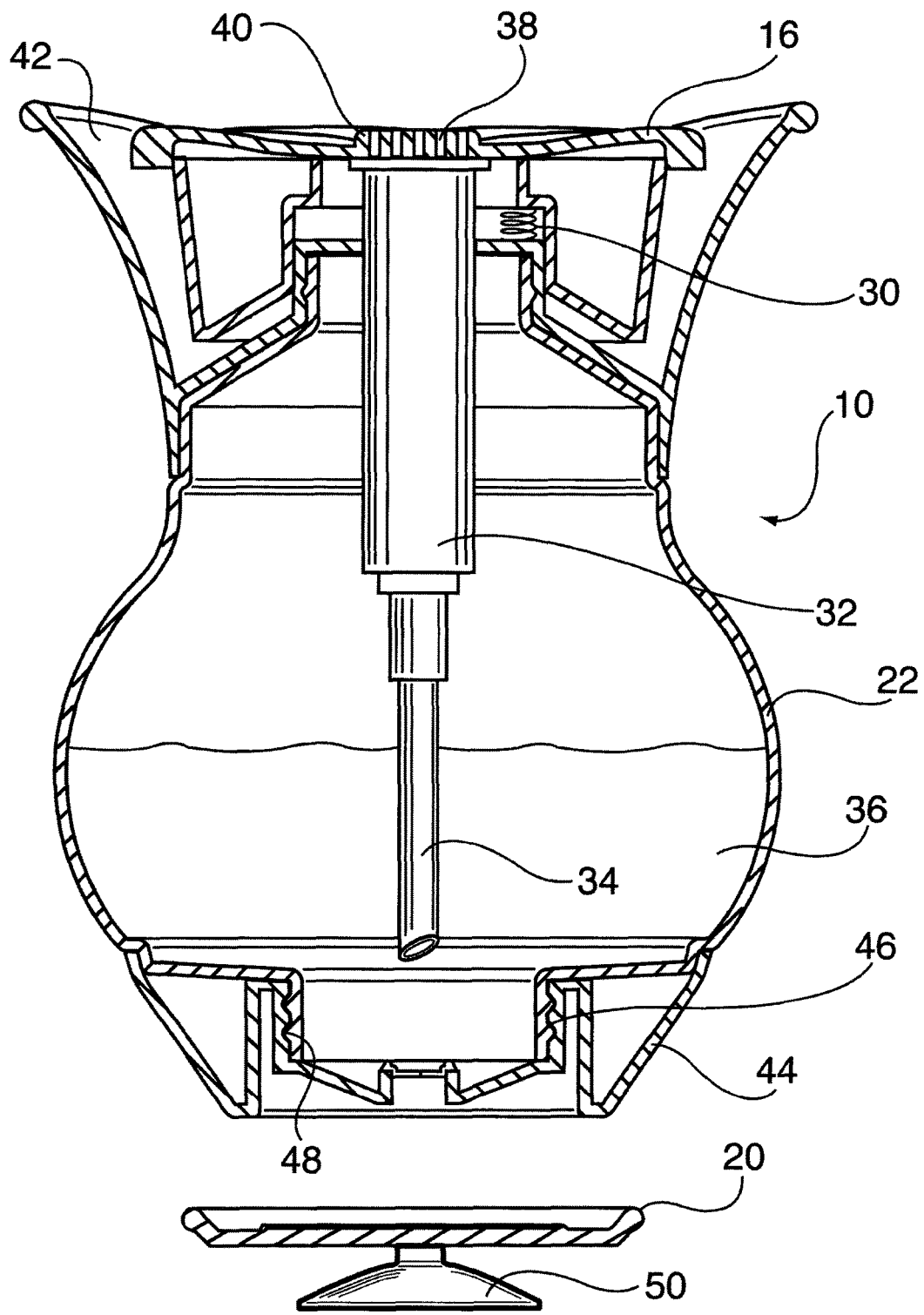
FIG. 5 is a cross sectional and somewhat schematic view showing the interior of the liquid soap dispenser of my invention.

FIG. 5, which is a cross sectional and schematic representation of the interior of the soap dispenser 10, best illustrates the operation thereof. The upper surface 16 is mounted on the container 18 for movement between an upper position, as shown in FIG. 5, and a lower position (not shown). Spring means, such as coil spring 30, biases the upper surface into the upper position.

Located within the container 18 and connected to the upper surface 16 is a pump 32 having a tube 34 extending downwardly into the quantity of liquid soap 36 located within the container 18. As the upper surface 16 is moved downwardly, the pump 32 is activated and a small amount of the liquid soap is pumped upwardly through one or more orifices 38 located at the center 40 of the upper surface 16. The details of the pump 32 and the manner in which it pumps liquid soap onto the upper surface 16 of the container 18 is, per se, well known in the art. Accordingly, it is not believed that a detailed description thereof is necessary. Examples of known pumping mechanisms that can be used are shown in U.S. Pat. Nos. 7,726,517; 7,980,777; 2,593,591; 3,739,955; 4,757,922 and 4,865,228 referred to above. Again, the contents of these prior art patents are incorporated herein by reference.

It should be noted that any excess liquid soap that may accumulate on the upper surface 16 can be poured into the well 42 that surrounds the upper surface 16 by simply tilting the container 18 to a side (or front or back). The liquid soap in the well 42 can then be used later or washed out of the well.

Figure 4:
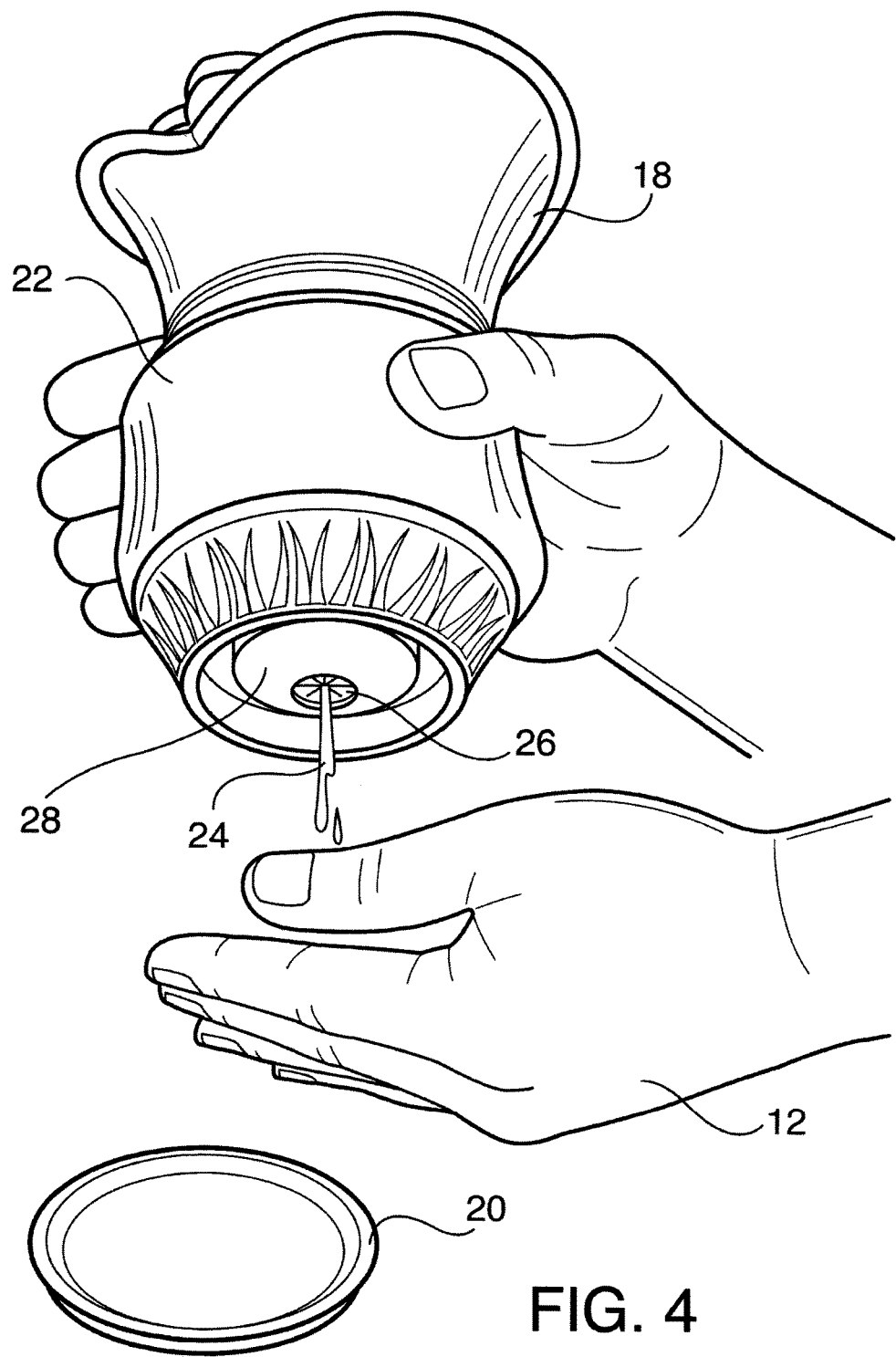
FIG. 4 is a bottom perspective view similar to FIG. 1 but showing liquid soap being dispensed from the bottom of the dispenser onto a person's hand.

As shown best in FIG. 4, a normally closed valve 26 is located adjacent the bottom 28 of the container 18. The valve 26 may be a simple disk of rubber-like material, such as silicone, having one or more slits therein. When the flexible wall portion 22 of the container 18 is squeezed, a portion 24 of the liquid soap 36 within the container 18 is forced through the self-sealing valve 26. Such self-sealing valves are described, for example, in U.S. Pat. Nos. 4,728,006 and 5,033,655, the entire contents of which are incorporated herein by reference. Obviously, more complex self-sealing or normally closed valves could be substituted but are not believed to be necessary.

In the preferred embodiment of the invention, the valve 26 is part of a cap 44 that can be threaded onto the bottom of the container 18 through the mating threads 46 and 48. The cap 44 acts as a stand for the dispenser 10. In addition, the cap can be unscrewed to gain access to the interior of the container 18 to fill or refill the container with liquid soap. The cap or stand 44 also preferably rests on the tray 20. In this way, any soap that might drip out of the valve 26 will fall into the tray 20. In addition, the tray 20 may have a suction cup 50 at the bottom thereof to allow the same to be attached to a sink or countertop or the like to maintain it in place.

The present invention may be embodied in other specific forms without departing from the spirit or essential attributes thereof and accordingly, reference should be made to the appended claims rather than to the foregoing specification as indicating the scope of the invention.

I claim:

1. A liquid soap dispenser comprising:
   a container including a quantity of liquid soap therein, at least a portion of said container having a flexible outer wall;
   an upper surface adjacent the top of said container, said upper surface being mounted for movement between an upper position and a lower position;
   spring means biasing said upper surface into said upper position;
   a pump within said container, said pump pumping a portion of said liquid soap from said container onto said upper surface when said upper surface is moved downwardly into its lower position;
   a valve located adjacent the bottom of said container and communicating with said quantity of liquid soap within said container, said valve being biased into a closed condition but opening to dispense some liquid soap from the bottom of said container when said flexible wall of said container is squeezed, and
   a tray located beneath said container with a suction cup at the bottom of said tray whereby said container can be lifted away from said tray when it is desired to use said container and said suction cup maintains said tray in place.

2. The liquid soap dispenser as claimed in claim 1 wherein said valve is a self-sealing valve.

3. The liquid soap dispenser as claimed in claim 2 wherein said valve is formed of silicone rubber having a slit formed therein.

4. The liquid soap dispenser as claimed in claim 1 further including a cap threaded to the bottom of said container.

5. The liquid soap dispenser as claimed in claim 4 wherein said cap can be removed to gain access to the interior of said container.

6. The liquid soap dispenser as claimed in claim 5 wherein said cap functions as a stand for said container.

7. The liquid soap dispenser as claimed in claim 6 wherein said valve is located in said cap.

* * * * *